(12) United States Patent
Aquilina et al.

(10) Patent No.: US 11,230,226 B1
(45) Date of Patent: Jan. 25, 2022

(54) VEHICLE CARGO AREA LIGHTING SYSTEM AND CARGO AREA LIGHTING METHOD

(71) Applicant: Ford Global Technologies, LLC, Dearborn, MI (US)

(72) Inventors: Anthony Nicholas Aquilina, Royal Oak, MI (US); Michael Bryan VanBelle, Canton, MI (US); Anthony Maraldo, Southgate, MI (US); Kyle Cendrowski, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/354,063

(22) Filed: Jun. 22, 2021

(51) Int. Cl.
*B60Q 3/30* (2017.01)
*B60Q 3/54* (2017.01)
*B60Q 3/82* (2017.01)
*B60Q 3/40* (2017.01)
*B60Q 3/74* (2017.01)

(52) U.S. Cl.
CPC ............... *B60Q 3/30* (2017.02); *B60Q 3/40* (2017.02); *B60Q 3/54* (2017.02); *B60Q 3/74* (2017.02); *B60Q 3/82* (2017.02); *B60Q 2500/10* (2013.01)

(58) Field of Classification Search
CPC ... B60Q 3/30; B60Q 3/54; B60Q 3/40; B60Q 3/82; B60Q 3/74; B60Q 2500/10
USPC ......................... 362/496, 154, 155
See application file for complete search history.

(56) References Cited

U.S. PATENT DOCUMENTS

| | | | | |
|---|---|---|---|---|
| 2,146,701 A | * | 2/1939 | Peterson | B60Q 3/30 362/496 |
| 2,329,882 A | * | 9/1943 | Clark | B60Q 1/28 362/496 |
| 3,175,186 A | * | 3/1965 | Bela | B60Q 7/00 362/464 |
| 2020/0122636 A1 | * | 4/2020 | Oh | B60Q 3/30 |
| 2021/0053498 A1 | | 2/2021 | Howard, II et al. | |

FOREIGN PATENT DOCUMENTS

KR 19980023499 U 7/1998
KR 19980051035 U 10/1998

OTHER PUBLICATIONS

Image of Mercedes W124 Hood Opened (1986-1993). (Year: 2020).*
Priddle, Alisa, The 2022 Ford F-150 Lightning EV Has Frunking Fantastic Storage, May 20, 2021.

* cited by examiner

*Primary Examiner* — Laura K Tso
(74) *Attorney, Agent, or Firm* — David Coppiellie, Esq.; Carlson, Gaskey & Olds, P.C.

(57) ABSTRACT

A vehicle cargo area lighting system includes, among other things, a cover assembly and at least one cargo area light. The cover assembly is movable back and forth between a closed position and an open position. The cover assembly covers a cargo area of a vehicle when the cover assembly is in the closed position. The cover assembly has a top portion and a wall portion. The wall portion extends vertically downward from the top portion when the cover assembly is in the closed position. The cargo area light is secured to an interior side of the wall portion. The cargo area light is configured to illuminate the cargo area when the cover assembly is in the open position.

20 Claims, 4 Drawing Sheets

VEHICLE CARGO AREA LIGHTING SYSTEM AND CARGO AREA LIGHTING METHOD

TECHNICAL FIELD

This disclosure relates generally to illuminating a cargo area of a vehicle and, in particular, illuminating a cargo area provided by a frunk of an electrified vehicle.

BACKGROUND

Many electrified vehicles do not include an internal combustion engine. These electrified vehicles can include a front storage compartment, which is also known as a front trunk or "frunk." Because there is no need to package an internal combustion engine at a front of the vehicle, this area is available to hold cargo.

SUMMARY

A vehicle cargo area lighting system according to an exemplary aspect of the present disclosure includes, among other things, a cover assembly and at least one cargo area light. The cover assembly is movable back-and-forth between a closed position and an open position. The cover assembly covers a cargo area of a vehicle when the cover assembly is in the closed position. The cover assembly has a top portion and a wall portion. The wall portion extends vertically downward from the top portion when the cover assembly is in the closed position. The cargo area light is secured to an interior side of the wall portion. The cargo area light is configured to illuminate the cargo area when the cover assembly is in the open position.

In another exemplary aspect of the foregoing system, the cargo light includes a first light that is offset from a centerline of the vehicle on a passenger side of the wall portion, and a second light that is offset from the centerline of the vehicle on a driver side of the wall portion.

Another exemplary embodiment of any of the foregoing lighting systems includes a grille-like member secured to an exterior side of the wall portion.

In another exemplary embodiment of any of the foregoing lighting systems, the cargo area is a frunk.

In another exemplary embodiment of any of the foregoing lighting systems, the wall portion is a front wall portion at a front end of the vehicle.

In another exemplary embodiment of any of the foregoing lighting systems, the vehicle is an electrified vehicle.

In another exemplary embodiment of any of the foregoing systems, when the cover assembly is in the closed position, the top portion is disposed along a substantially horizontal plane and the wall portion is disposed along a substantially vertical plane.

In another exemplary embodiment of any of the foregoing systems, the wall portion includes an inner panel secured to an outer panel.

Another exemplary embodiment of any of the foregoing systems includes at least one mechanical fastener that secures the at least one cargo area light directly to the inner panel.

In another exemplary embodiment of any of the foregoing systems, the mechanical fastener is a threaded nut that engages a threaded rod extending from the at least one cargo area light.

Another exemplary embodiment of any of the foregoing systems includes a seal that seals an interface between the cargo area light and the inner panel.

In another exemplary embodiment of any of the foregoing lighting systems, the cargo area light moves with the wall portion of the cover assembly back and forth between the open position and the closed position.

In another exemplary embodiment of any of the foregoing lighting systems, the wall portion is disposed between a passenger side headlight and a driver side headlight when the cover assembly is in the closed position.

A vehicle cargo area lighting method according to another exemplary aspect of the present disclosure includes, among other things, pivoting a cover assembly from a closed position to an open position to provide access to a cargo area of the vehicle. The method further includes illuminating the cargo area using at least one cargo area light that is secured to a wall portion of a cover assembly. The wall portion extends vertically downward from a top portion of the cover assembly when the cover assembly is in the closed position.

In another exemplary embodiment of the foregoing method, the cargo area is a frunk.

In another exemplary embodiment of any of the foregoing methods, a grille-like member is secured to an exterior side of the wall portion. The cargo area light is secured to an interior side of the wall portion.

In another exemplary embodiment of any of the foregoing methods, the at least one cargo area light includes a first light that is offset from the centerline of the vehicle to passenger side of the vehicle and a second light that is offset from the centerline of the vehicle to a driver side of the vehicle.

In another exemplary embodiment of any of the foregoing methods, the cargo area light moves with the wall portion of the cover assembly back and forth between the open position and the closed position.

In another exemplary embodiment of any of the foregoing methods, when the cover assembly is in the closed position, the lid is disposed along a substantially horizontal plane and the wall portion is disposed along a substantially vertical plane.

Another exemplary embodiment of any of the foregoing methods includes activating the cargo area lights in response to at least one of a front trunk latch unlatching, a switch transitioning, or a command sent from a smartphone.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details systems and methods associated with illuminating a cargo area of a vehicle and, particularly, illuminating a frunk of a vehicle.

Figure 1:
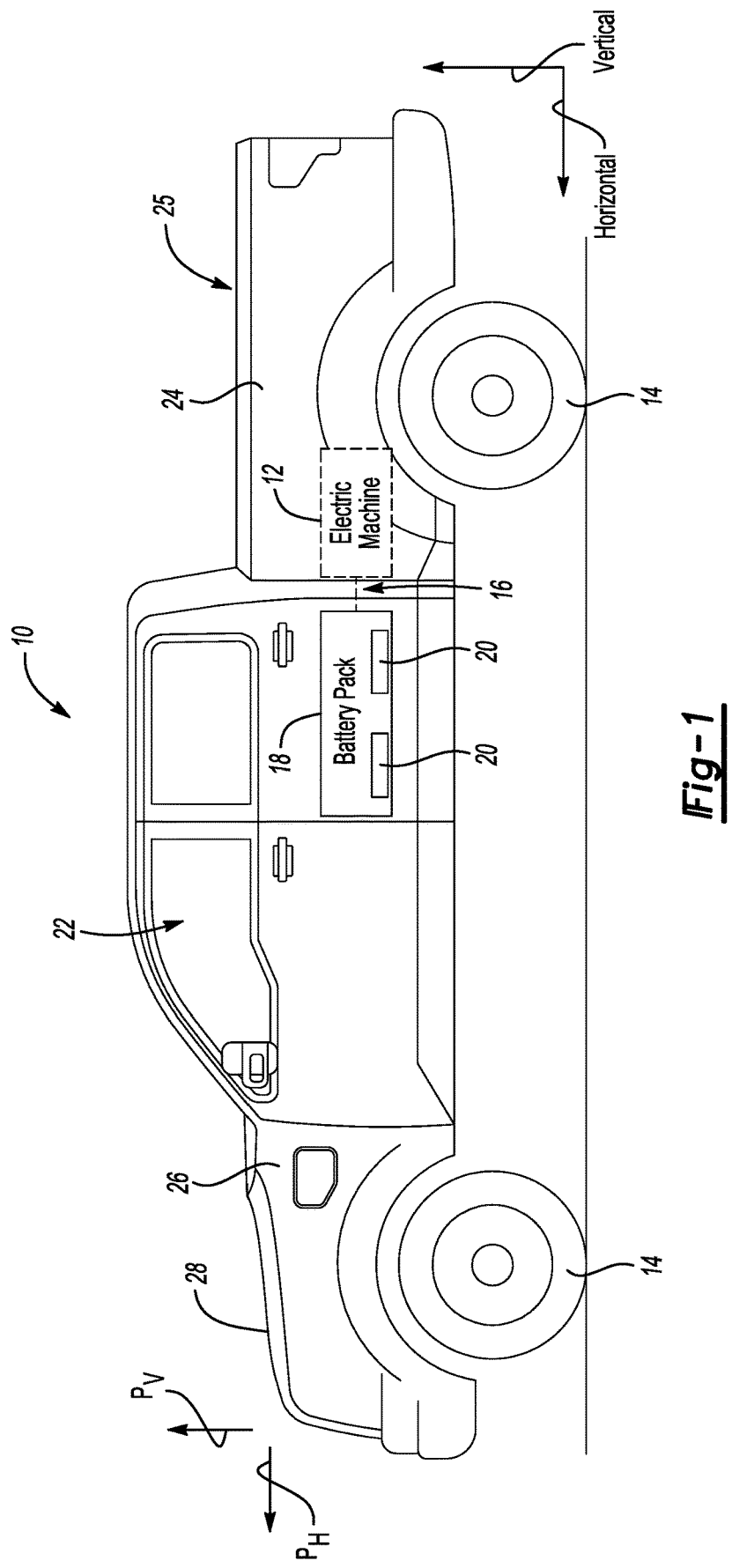
FIG. 1 illustrates a side view of an example electrified vehicle having a cargo area covered by a cover assembly in a closed position.

With reference to FIG. 1, an electrified vehicle 10 includes an electrified powertrain. In the exemplary embodiment, the electrified vehicle 10 is a battery electric vehicle (BEV). However, the concepts described here are not limited to BEVs and could extend to other electrified vehicles, including, but not limited to, plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle.

In the embodiment illustrated in FIG. 1, the vehicle 10 is a full electric vehicle propelled through at least one electric machine 12 without any assistance from an internal combustion engine. The electric machine 12 may operate as an electric motor, an electric generator, or both. The electric machine 12, when powered, provides a rotational output torque to one or more drive wheels 14 through, for example, a transmission or gear box (not shown).

A voltage bus 16 electrically connects the electric machine 12 to a battery pack 18. The battery pack 18 can be a high-voltage traction battery pack that includes one or more battery arrays 20 (i.e., battery assemblies or groupings of rechargeable battery cells) capable of outputting electrical power to operate the electric machine 12 and/or electrical loads of the electrified vehicle.

As can be appreciated, in the exemplary embodiment, the electrified vehicle 10 is a pickup truck. However, the electrified vehicle 10 could also be a car, van, sport utility vehicle, or any other type of vehicle.

The electrified vehicle 10 includes a passenger compartment 22, a truck bed 24, and a front trunk 26. The truck bed 24 is aft of the passenger compartment 22. The front trunk 26 is in front of the passenger compartment 22. The truck bed 24 establishes a cargo area 25 at a rear of the electrified vehicle 10. The front trunk 26 establishes a cargo area 27 at a front of the electrified vehicle 10. The front trunk 26 can be referred to as a "frunk." The cargo area provided by the front trunk 26 is not typically available in conventional vehicles that have an internal combustion engine.

Figure 2:
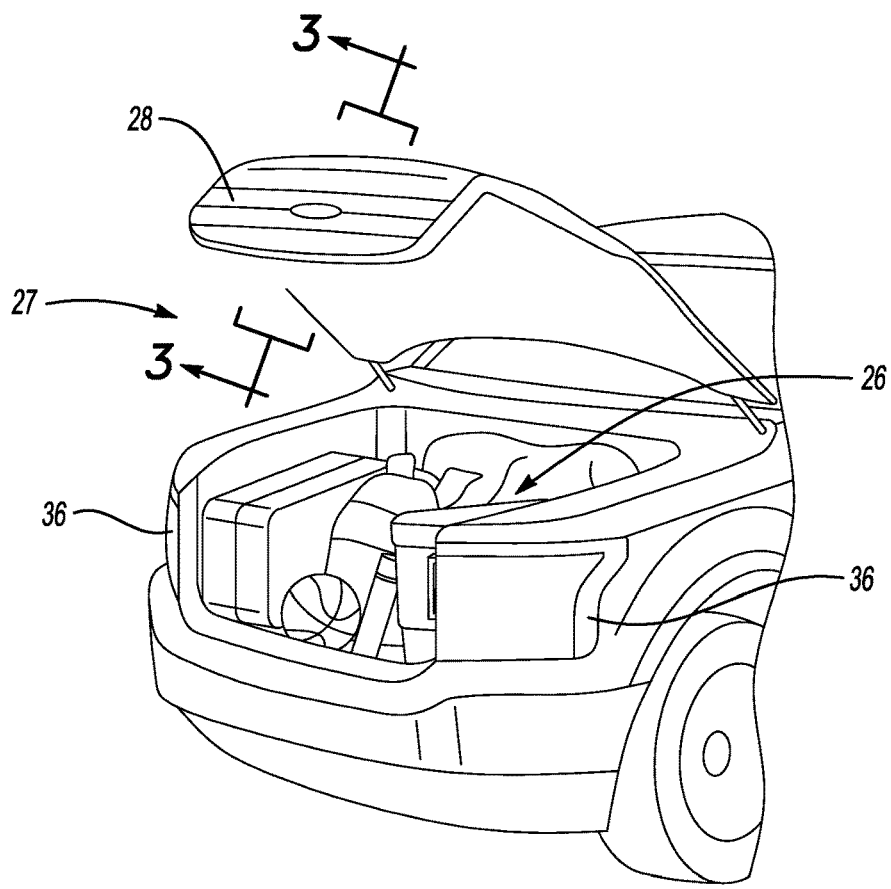
FIG. 2 illustrates a perspective view of the cargo area of the electrified vehicle of FIG. 1 with the cover assembly in an open position.
Figure 3:
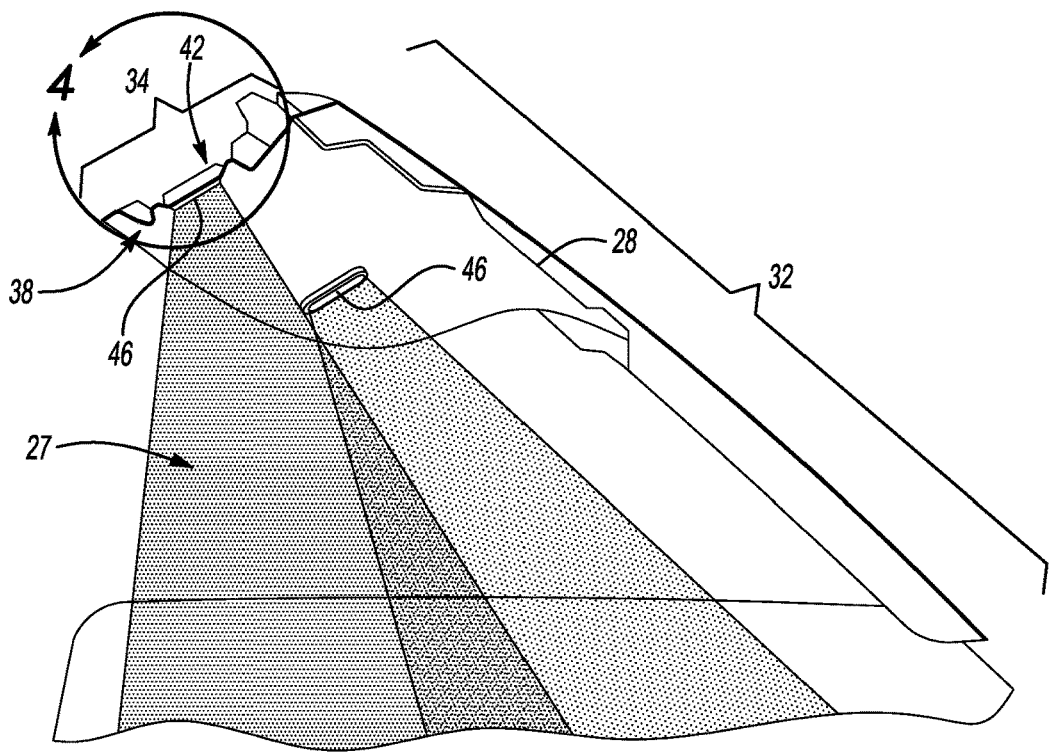
FIG. 3 illustrates a section taken at line 3-3 in FIG. 2.

The electrified vehicle 10 includes a cover assembly 28 that is movable back and forth between the closed position of FIG. 1 and the open position shown in FIGS. 2 and 3. The cover assembly 28 covers the cargo area 27 provided by the front trunk 26 when the cover assembly 28 is in the closed position. When access to the cargo area 27 is required, the cover assembly 28 can be moved to an open position, such as the open position shown in FIGS. 2 and 3.

The cover assembly 28 has a top portion 32 and a wall portion 34. The top portion 32 covers a top of the front trunk 26. The wall portion 34 covers a front of the front trunk 26. The wall portion 34 extends vertically downward from the top portion 32 when the cover assembly 28 is in the closed positon of FIG. 1. The wall portion 34 is disposed between headlights 36 of the vehicle 10 when the cover assembly 28 is in the closed position.

When the cover assembly 28 is in the closed position, the top portion 32 is disposed along a substantially horizontal plane PH, and the wall portion 34 is disposed along a substantially vertical plane Pv. Vertical and horizontal are with reference to ground and a general orientation of the electrified vehicle 10 during ordinary operation.

The wall portion 34 has an interior side 38 and an exterior side 42. When the cover assembly 28 is in the closed position, the interior side 38 faces the cargo area 27. The exterior side 42 faces forward away from the cargo area 27.

At least one cargo area light 46 is secured to the interior side 38 of the wall portion 34. The at least one cargo area light 46 illuminates the cargo area 27 of the front trunk 26 when the cover assembly 28 is in an open position. Light provided by the at least one cargo area light 46 can enhance visibility for a user accessing the cargo area 27.

Securing the at least one cargo area light 46 to the wall portion 34 positions the at least one cargo area light 46 in an area that facilitates illuminating the front trunk 26 without directing light into the eyes of the user accessing the cargo area 27. Further, cargo within cargo area 27 does not block light emitted from the at least one cargo area light 46. Cargo within the cargo area 27 could block light emitted from a light secured to a side of the front trunk 26.

The at least one cargo area light 46 is secured directly to the wall portion 34 of the covering assembly 28 associated with the front trunk 26 in this example. In other examples, the at least one cargo area light 46 could be secured to a wall portion of the cover assembly associated with a rear trunk of a vehicle.

Figure 4:
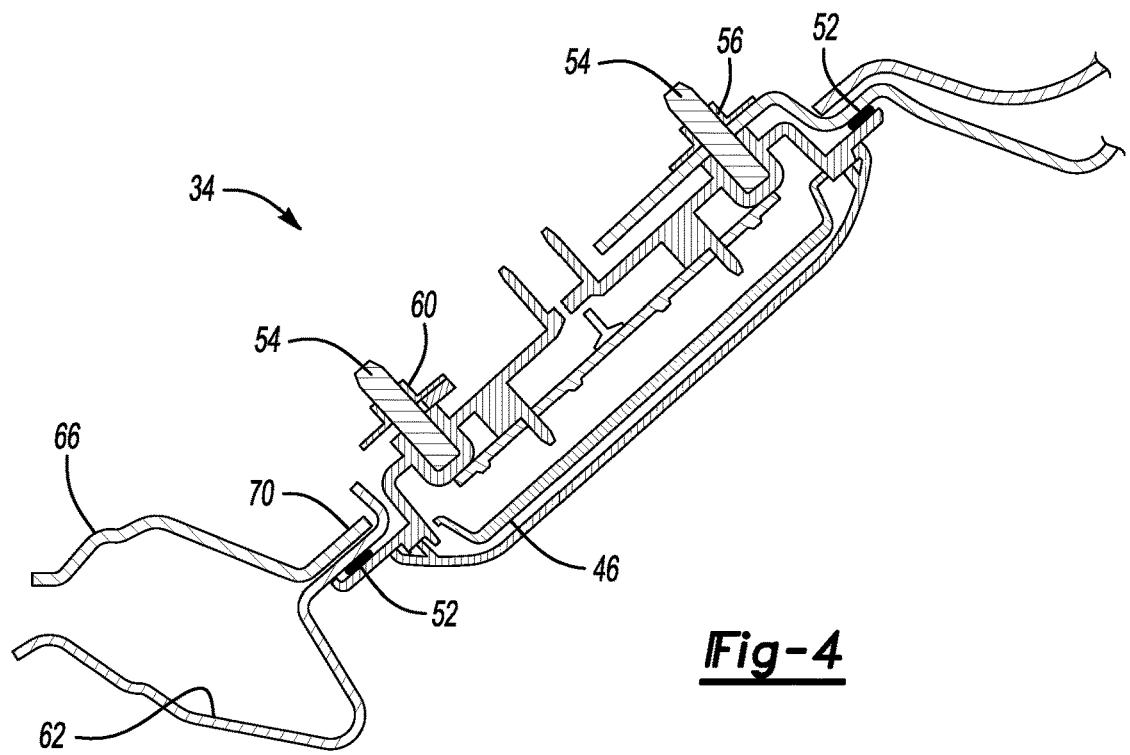
FIG. 4 illustrates a close-up view of Area 4 in FIG. 3.
Figure 6:
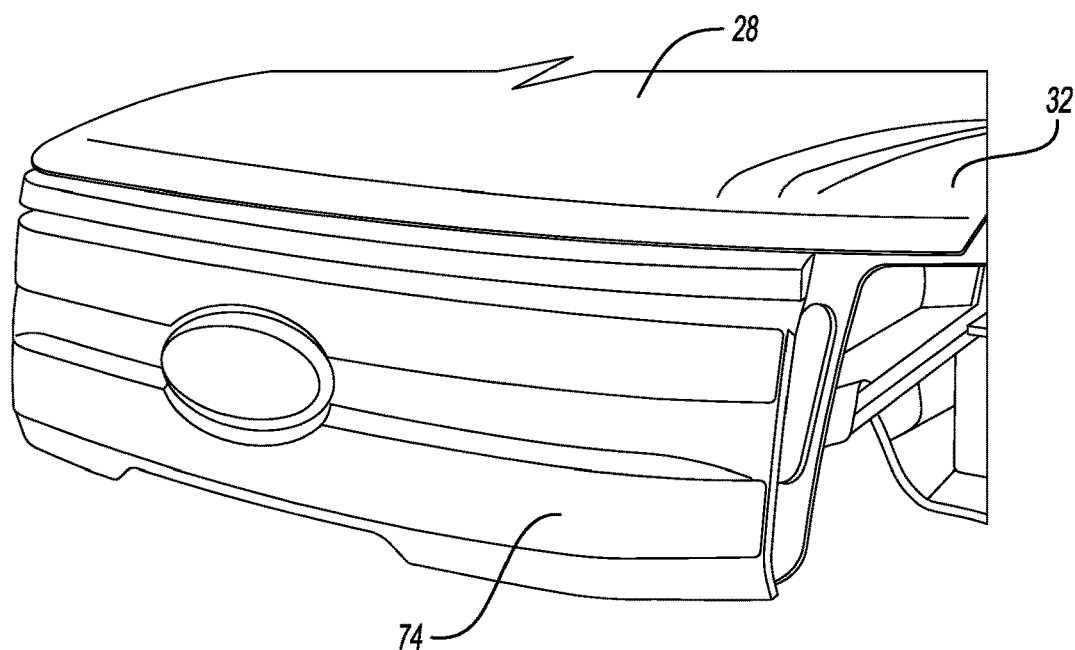
FIG. 6 illustrates a perspective view of the cover assembly of FIG. 1 without a grille-like member secured to an exterior side of a wall portion.
Figure 5:
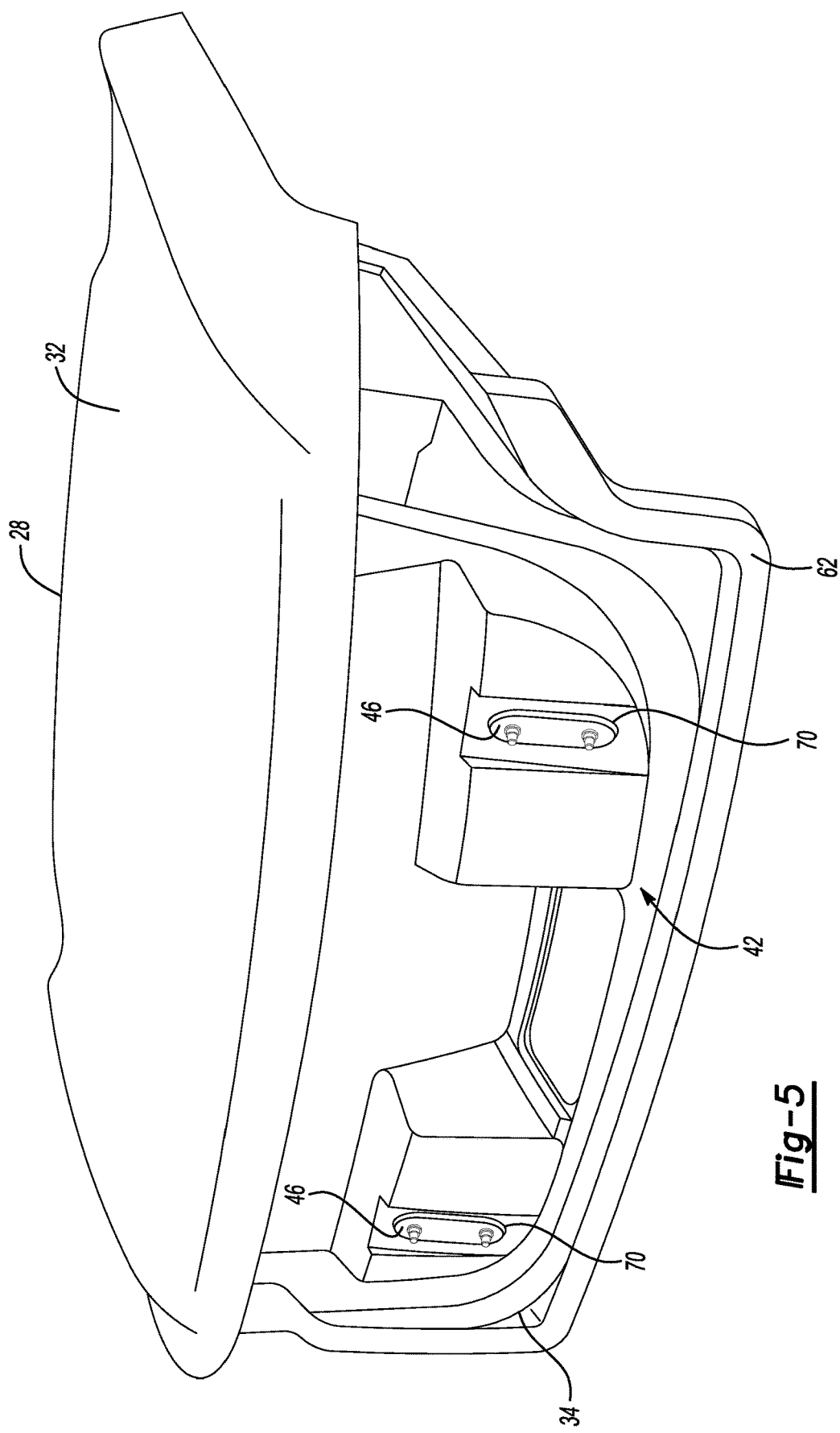
FIG. 5 illustrates a perspective view of the cover assembly of FIG. 1 without a grille-like member secured to an exterior side of a wall portion.

With reference now to FIGS. 4-6 and continued reference to FIGS. 1-3, in the exemplary embodiment, the at least one cargo area light 46 includes two cargo area lights 46. One of the cargo area lights 46 is offset from a centerline of the vehicle 10 on a passenger side of the wall portion 34, and a second light that is offset from the centerline of the vehicle 10 on a driver side of the wall portion 34. Offsetting the cargo area lights 46 from the centerline can reduce the likelihood of the user blocking light from the cargo area lights 46 when the user is leaning toward the cargo area 27. The user is typically at the centerline of the vehicle 10 when accessing the cargo area 27.

The exemplary cargo area lights 46 can be activated to emit light from light emitting diodes held within a housing and covered by a lens. Other example cargo area lights 46 could emit light in other ways.

The cargo area lights 46 can be activated and deactivated by various ways (e.g. upon a front trunk latch unlatching, in response to a transition of a switch inside the front trunk or vehicle compartment, in response to a command from vehicle software or a smart phone app, etc.).

A seal 52 can be used to seal an interface between the cargo area lights 46 and the wall portion 34. The seal 52 can block moisture and contaminants from entering the cargo area 27. The cargo area lights 46 can include a lip or flange that directly contacts the seal 52.

In this example, the cargo area lights 46 include threaded posts 54 that extend through respective openings 56 in the wall portion 34 (FIG. 4) to threadably engage a mechanical fastener 60.

The wall portion 34 includes, in the exemplary embodiment, an inner panel 62 and an outer panel 66. The openings

56 are within the inner panel 62 of the wall portion 34. The cargo area lights 46 are directly secured to the inner panel 62.

The mechanical fasteners 60 can threadably engage the threaded posts 54 of the cargo area lights 46 through an aperture 70 in the outer panel 66. The cargo area lights 46 can be secured from outside the cargo area 27, which can facilitate assembly.

In this example, a grille-like member 74 is secured to the exterior side 42 of the wall portion 34 to conceal the threaded posts 54, fasteners 60, and other areas of the at least one cargo area light 46. The grille-like member 74 aesthetically mimics grilles utilized in conventional vehicles to communicate a flow of air to an engine compartment.

Because the vehicle 10 lacks an internal combustion engine, the flow of air through a grille is not needed. The grille-like member 74 is thus not used to communicate air to the cargo area 27 or any other area of the vehicle. The grille-like member 74 is decorative and not functional in this example.

Features of the disclosed examples include illuminating a cargo area of a vehicle utilizing at least one cargo area light that is secured to a wall portion of a cover assembly. The wall portion extends vertically downward from a top portion of the cover assembly when the cover assembly is in a closed position.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle cargo area lighting system, comprising:
   a cover assembly movable back-and-forth between a closed position and an open position, the cover assembly covering a cargo area of a vehicle when the cover assembly is in the closed position, the cover assembly having a top portion and a wall portion, the wall portion extending vertically downward from the top portion when the cover assembly is in the closed position; and
   at least one cargo area light secured to an interior side of the wall portion, the cargo area light configured to illuminate the cargo area when the cover assembly is in the open position,
   wherein the at least one cargo area light is secured to the interior side of the wall portion from outside the cargo area.

2. The vehicle cargo area lighting system of claim 1, wherein the at least one cargo area light includes a first light that is offset from a centerline of the vehicle on a passenger side of the wall portion, and a second light that is offset from the centerline of the vehicle on a driver side of the wall portion.

3. The vehicle cargo area lighting system of claim 1, further comprising a grille-like member secured to an exterior side of the wall portion, the grille-like member configured conceal areas of the at least one cargo area light.

4. The vehicle cargo area lighting system of claim 1, wherein the cargo area is provided by a frunk.

5. The vehicle cargo area lighting system of claim 1, wherein the wall portion is a front wall portion at a front end of the vehicle.

6. The vehicle cargo area lighting system of claim 1, wherein the vehicle is an electrified vehicle.

7. The vehicle cargo area lighting system of claim 1, wherein, when the cover assembly is in the closed position, the top portion is disposed along a substantially horizontal plane and the wall portion is disposed along a substantially vertical plane.

8. The vehicle cargo area lighting system of claim 1, wherein the wall portion includes an inner panel secured to an outer panel, the outer panel including an aperture, wherein a portion of the at least one cargo area light is received within the aperture of the outer panel.

9. The vehicle cargo area lighting system of claim 8, further comprising at least one threaded mechanical fastener that secures the at least one cargo area light directly to the inner panel.

10. The vehicle cargo area lighting system of claim 9, wherein the mechanical fastener is a threaded fastener that engages a threaded rod extending from the at least one cargo area light.

11. The vehicle cargo area lighting system of claim 9, further comprising a seal that seals an interface between the at least one cargo area light and the inner panel.

12. The vehicle cargo area lighting system of claim 1, wherein the at least one cargo area light moves with the wall portion of the cover assembly back-and-forth between the open position and the closed position.

13. The vehicle cargo area lighting system of claim 1, wherein the wall portion is disposed between a passenger side headlight and a driver side headlight when the cover assembly is in the closed position.

14. A vehicle cargo area lighting method, comprising:
    pivoting a cover assembly from a closed position to an open position to provide access to a cargo area of a vehicle; and
    illuminating the cargo area using at least one cargo area light that is secured to a wall portion of a cover assembly, the wall portion extending vertically downward from a top portion of the cover assembly when the cover assembly is in the closed position, wherein the at least one cargo area light is secured to an interior side of the wall portion from outside the cargo area.

15. The vehicle cargo area lighting method of claim 14, wherein the cargo area is provided by a frunk.

16. The vehicle cargo area lighting method of claim 14, wherein a grille-like member is secured to an exterior side of the wall portion, the at least one cargo area light secured to an interior side of the wall portion, the grille-like member configured conceal areas of the at least one cargo area light.

17. The vehicle cargo area lighting method of claim 14, wherein the at least one cargo area light comprises a first light that is offset from a centerline of the vehicle to a passenger side of the vehicle, and a second light that is offset from the centerline of the vehicle to a driver side of the vehicle.

18. The vehicle cargo area lighting method of claim 14, wherein, when the cover assembly is in the closed position, the top portion is disposed along a substantially horizontal plane and the wall portion is disposed along a substantially vertical plane.

19. The vehicle cargo area lighting method of claim 14, further comprising activating the cargo area lights in response to at least one of a front trunk latch unlatching, a switch transitioning, or a command sent from a smartphone.

20. The vehicle cargo area lighting method of claim 14, further comprising securing the at least one cargo area light when the at least one cargo area light is extending through an aperture in an outer panel of the wall portion, and then covering a portion of the at least one cargo area light that extends through the aperture with a grille-like member that is secured to an exterior side of the wall portion.

* * * * *